(12) United States Patent  (10) Patent No.: US 7,925,309 B2
Söderlund                   (45) Date of Patent:     Apr. 12, 2011

(54) ROTATABLE MODULE WITH TWO INPUT DEVICES FOR A MOBILE COMMUNICATION APPARATUS

(75) Inventor: Marcus Söderlund, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 818 days.

(21) Appl. No.: 11/721,987

(22) PCT Filed: Dec. 15, 2005

(86) PCT No.: PCT/EP2005/056812
§ 371 (c)(1),
(2), (4) Date: Nov. 14, 2007

(87) PCT Pub. No.: WO2006/067081
PCT Pub. Date: Jun. 29, 2006

(65) Prior Publication Data
US 2009/0264152 A1    Oct. 22, 2009

(30) Foreign Application Priority Data
Dec. 21, 2004    (EP) ..................................... 04030376

(51) Int. Cl.
H04M 1/00    (2006.01)
H01R 13/60   (2006.01)
H01R 13/66   (2006.01)
B65H 75/48   (2006.01)

(52) U.S. Cl. .................. 455/575.1; 455/575.3; 379/438; 439/528; 242/378.1

(58) Field of Classification Search ............... 455/575.1, 455/575.3, 575.4, 90.3; 379/438; 439/528; 242/378.1
See application file for complete search history.

(56) References Cited

U.S. PATENT DOCUMENTS

| | | | |
|---|---|---|---|
| 7,483,723 B2 * | 1/2009 | Soderlund | 455/575.1 |
| 2004/0142734 A1 | 7/2004 | Kim | |
| 2004/0176047 A1 | 9/2004 | Trively | |
| 2005/0239520 A1 * | 10/2005 | Stefansen | 455/575.1 |

FOREIGN PATENT DOCUMENTS

| | | |
|---|---|---|
| EP | 1 339 203 | 8/2003 |
| WO | 2004/036881 | 4/2004 |

OTHER PUBLICATIONS

International Search Report for corresponding Application No. PCT/EP2005/056812 mailed Apr. 24, 2006.

* cited by examiner

*Primary Examiner* — Un C Cho
(74) *Attorney, Agent, or Firm* — Renner, Otto, Boisselle & Sklar, LLP (57) ABSTRACT

A portable electronic device (1) comprising a first portion (3, 53) including at least one output device (2) for rendering output data and a second portion (4, 54) comprising at least two input devices (10, 11, 20, 30, 40) for manually inputting data into the portable electronic device. The second portion is rotatably connected to the first portion. The output device is directed in the same direction as a first input device when the second portion is positioned in a first position, and in the same direction as another input device when the second portion is positioned in a second position.

8 Claims, 7 Drawing Sheets

ROTATABLE MODULE WITH TWO INPUT DEVICES FOR A MOBILE COMMUNICATION APPARATUS

TECHNICAL FIELD OF THE INVENTION

The present invention relates to a portable electronic device comprising a first and a second portion, which are rotatable relative each other.

DESCRIPTION OF RELATED ART

A portable electronic device, such as a personal digital assistant or a portable communication device, comprises input devices for manually inputting information into the device and an output device for outputting or displaying information to a user of the device. As more power, processing capacity and memory resources have been added to such electronic devices, the number of different input devices for manually inputting information into the device has increased. At the same time, the requirement on size has resulted in smaller electronic devices.

Initially, portable mobile telephones included only a single input device, namely a keypad for manually inputting information into the mobile telephone. As development progressed, other manual input devices, such as a rocker pad or a joystick, were added. However, at the same time, the mobile telephone became smaller and smaller. Finally, there was scarce space to add additional input devices and still keep a good operability of the mobile telephone.

This problem was solved by external manual input devices, such as an alphanumeric keypad or a game console, which were detachably connectable to a system connector of the mobile telephone. However, this solution is inconvenient for the user, who might need to manage a plurality of external devices to fulfil all his needs. The more external devices, the more inconvenience.

Alternatively, the manual input devices were positioned at different sides of the housing of the mobile telephone. However, positioning of input device on different sides is not convenient as the operability of the mobile telephone is deteriorated if the input device and the output device do not face in proper directions for operation. For example, it is known to include both a numeric keypad having a first set of keys and an alphanumeric keypad having a second set of keys intended to be used with the same output device of a mobile telephone. To use each keypad, it is convenient if the output device and the keypad face in the same direction. This has been solved by the prior art by including the numeric keypad into the housing of the mobile telephone. The alphanumeric keypad is provided as an external device connected to an accessory connector of the mobile telephone, as the numeric and the alphanumeric keypads are too bulky to fit in the housing of the mobile telephone.

Therefore it seems to be impossible to add further input devices to a portable electronic device when it is more or less an prerequisite for maintaining operability that the input device and the output device face in proper directions during operation, and still achieve the requirement of a small size.

WO 01/22697 discloses a mobile telephone having a numeric keypad. An accessory keyboard comprising an alphanumeric keyboard of the type described above may be detachably connected to an accessory connector of the mobile telephone. When the accessory keyboard is not used, it is detached from the mobile telephone may be used in a talking position. Thus, the user of the mobile telephone must keep track of both the mobile telephone and the accessory keyboard when not used together.

SUMMARY OF THE INVENTION

It is an object of the invention to provide a portable electronic device having increased flexibility for using different input devices.

According to a first aspect, the object is achieved by a portable electronic device, comprising a first portion including at least one output device for rendering output data, and a second portion comprising at least two input devices for manually inputting data into the portable electronic device. The second portion is rotatably connected to the first portion. The output device is directed in the same direction as a first input device when the second portion is positioned in a first position, and in the same direction as another input device when the second portion is positioned in a second position.

The second portion may be rotatable around an axis of rotation. The axis of rotation may be parallel with the output device. Moreover, the axis of rotation may extend in a longitudinal direction relative the second portion. The axis of rotation may also extend in a transverse direction relative the second portion.

The amount of rotation of the second portion relative the first portion may be within the range of 0-360 degrees. Alternatively, the amount of rotation of the second portion relative the first portion is in the range of 90-270 degrees. Still alternatively, the amount of rotation of the second portion relative the first portion may be in the range of 180-270 degrees.

A first input device may be positioned at a first side of the second portion, and another input device may be positioned at another side of the second portion. The other side may face in a direction substantially 180 degrees relative the first side.

The first input device may be positioned at a first side of the second portion and the other input device may be positioned at a second side of the second portion. The second side may face in a direction substantially 90 degrees relative the first side, and the first and second side may face in a substantially transverse direction relative an axis of rotation of the second portion.

The first input device may be positioned at a first side of the second portion, and the other input device may be positioned at another side of the second portion. The other side may face in a direction substantially 270 degrees relative the first side. The first and the other side may face in a substantially transverse direction relative an axis of rotation of the second portion.

The portable electronic device may comprise a PCB (Printed Circuit Board) provided in the second portion. A flex portion may be connected to or formed integral with a portion of the PCB. The flex portion may extend around a portion of the PCB at least when the second portion is rotated relative the first portion. The flex portion may comprise circuitry, which is connected to a contact at the end of the flex portion.

The second portion may be detachably connectable to the first portion. The second portion may comprise a hollow casing for receiving a part of the first portion.

The first portion and the second portion may comprise locking means for instantly locking the first portion to the second portion in an operational position.

The output device may be a display, and the plurality of input devices may be included in the group comprising keys for inputting characters, a numeric keypad, a QWERTY keypad, keys for inputting signs, a camera lens, a joystick, a rocker pad, a game pad, actuation buttons, a touch pad, a touch screen, character reading means, finger print recognition means, and eye recognition means.

The portable electronic device may be a radio terminal, a pager, a communicator, an electronic organizer, a smartphone, a handheld device or a personal digital assistant. Alternatively, the portable electronic device may be a mobile telephone.

Further embodiments of the invention are defined in the dependent claims.

It is an advantage of the invention that the flexibility of the portable electronic device is increased, as it may be adapted for use of different input devices. Also, it is an advantage that one and the same output device may be used together with a plurality of input devices, each of which may be in an operative position that makes the portable electronic device convenient to use. Furthermore, the portable electronic device is robust and stable during operation, as each of the input devices of the second portion may face in the same direction as the output interface during operation, whereby the portable electronic device may be conveniently held in a palm or positioned on a surface.

Another advantage of the invention is that the input interfaces may each be conveniently operated one at a time as the user watches the output interface, as the solution provides stable apparatus in several positions.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features, and advantages of the invention will appear from the following description of several embodiments of the invention, wherein various aspects of the invention will be described in more detail with reference to the accompanying drawings, in which:

FIG. 2b is a side view of a portion of the portable electronic device according to FIG. 2a;

DETAILED DESCRIPTION OF EMBODIMENTS

Figure 1A:
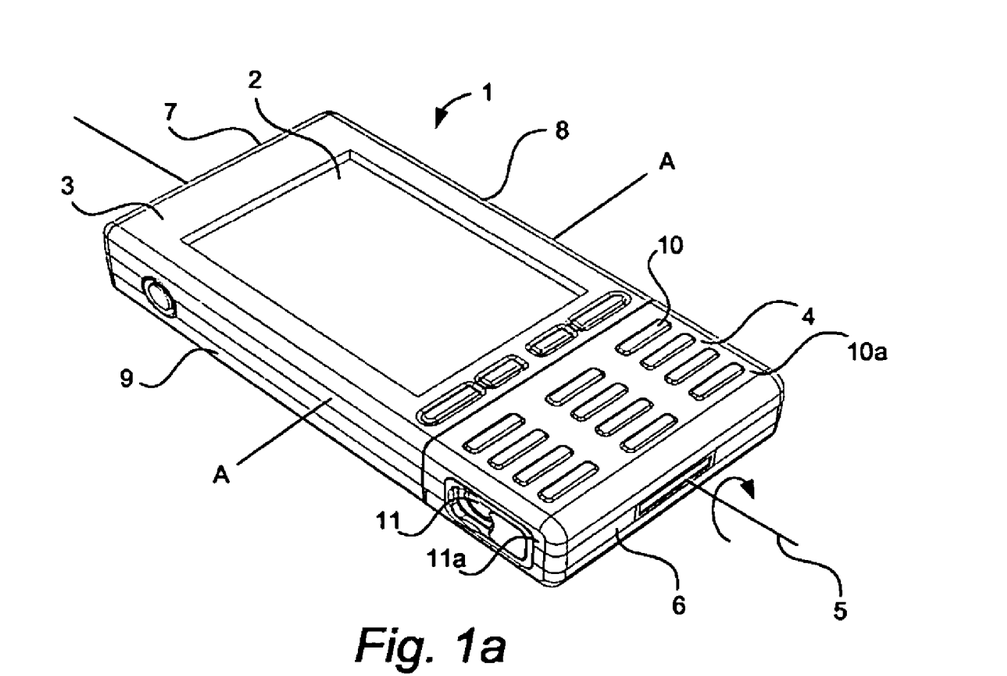
FIGS. 1a-1d are perspective views of different embodiments of the portable electronic device according to the invention.

FIG. 1a illustrates a portable electronic device 1 according to the invention comprising an input interface including at least two input devices 10, 11 for inputting information and data into the portable electronic device 1 and an output interface including at least one output device. The output device may be means for rendering data, such as a display 2. The input devices may be manual input devices, such as keys for inputting characters, keys for inputting numerals, a joystick, a rocker pad, a game pad, actuation buttons, a touch pad, a touch screen. Alternatively or additionally, the input devices are automatic input devices, such as a camera, character recognition means, finger print recognition means, and/or eye recognition means. The portable electronic device 1 may be a radio terminal, a pager, a communicator, an electronic organizer, a smartphone, a personal digital assistant, a handheld device, or a mobile telephone. However, the invention is not limited to these examples, but could be other portable electronic devices having an output interface and a plurality of input interfaces.

The portable electronic device comprises a first housing portion 3, in which at least one output device for rendering output data is positioned, and a second housing portion 4, in which at least two input devices are positioned. The second portion 4 is rotatably connected to the first portion 3. The second portion is rotatable around an axis of rotation 5, which is substantially parallel with the output device as explained in further detail below. The direction of the axis of rotation may be longitudinal or transversal relative the second portion 4. However, other angles relative the second portion 4 is also possibly within 360 degrees. In the embodiment of FIG. 1a, the axis of rotation extends through a bottom side 6 towards a top side 7 of the portable electronic device 1, i.e. in a longitudinal direction in relation to the rendering of objects on the output interface 2. Alternatively, the axis of rotation extends from side 8 to side 9 (axis A-A) in a transverse direction relative the second portion 2. It is an advantage that the axis of rotation extends longitudinally as the second portion may be rotated such that four sides, and thus four input devices, of the second portion 4 may face in the same direction as the output device 2.

FIGS. 1a-1e illustrates various manual input devices positioned in the second portion 4. In the embodiment of FIG. 1a, the second portion 4 comprises a numeric keypad 10 at a first side 10a.

Figure 1B:
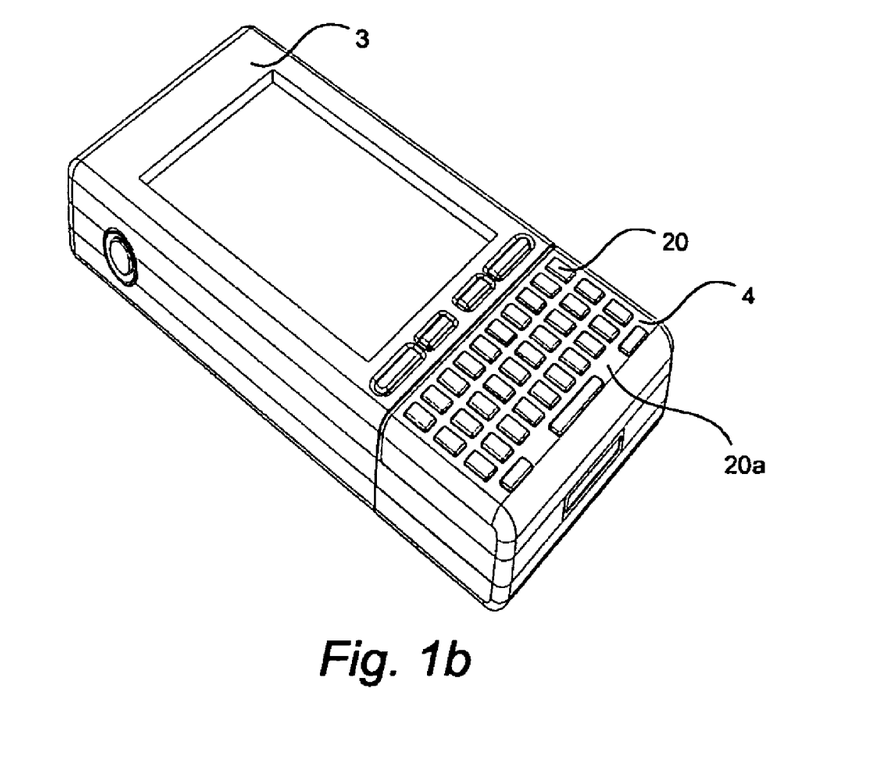

In the embodiment of FIG. 1b, the second portion 4 comprises an alphanumeric keypad 20 at a second side 20a positioned opposite to the first side 10a. The keypad may be used e.g. for writing a message, such as an SMS (Short Message Service) message. An alphanumeric keypad is also known as a QWERTY keypad or keyboard.

Figure 1C:
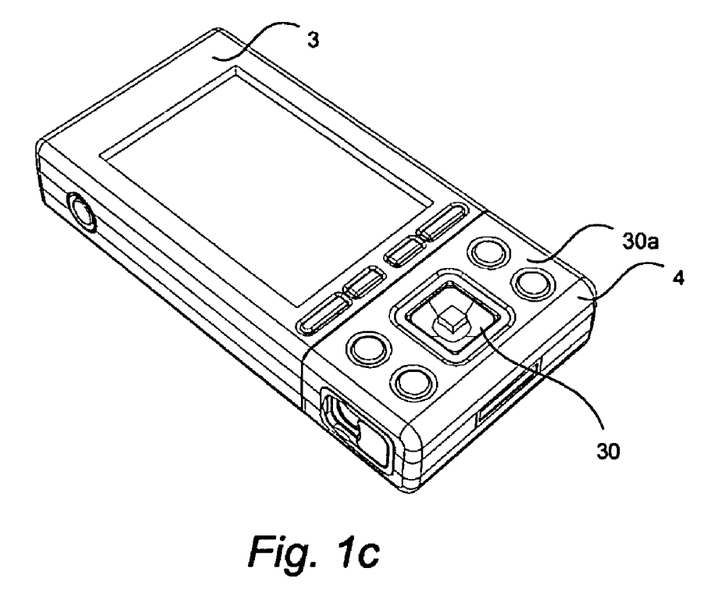

In the embodiment of FIG. 1c, the second portion 4 comprises a joystick 30 and additional keys, such as actuations keys of a game pad at one side 30a, which may be a side opposite side 10a or 20a.

Moreover, keys may be provided on the first portion 3 adjacent the display.

Figure 1D:
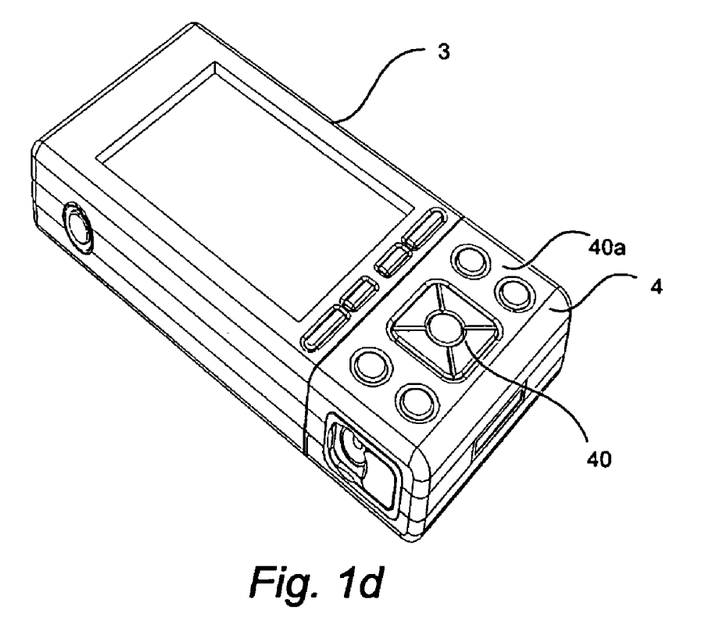

In the embodiment of FIG. 1d, the second portion 4 comprises a rocker pad 40 or navigation pad and additional buttons at one side 40a.

The manual input devices 10, 20, 30, 40 of FIGS. 1a-1d may be combined in any combination, whereby a first input device is positioned at a first side of the second portion 4 and a second input device is positioned at a second side of the second portion 4. The first and the second side may be substantially parallel. However, in other embodiments they are not parallel, as long as the first and the second input device may be conveniently operated with the output interface 2.

In the embodiment of FIG. 1a, a camera lens 11 is provided at a third side 11a facing 90 degrees in relation to the first side 10a. The camera lens 11 may be a lens for a digital photo and/or a video camera function.

The first side 10a and the third side 11a may have a different mutually interrelationship, such as facing in opposite directions. It is an advantage of the invention that the camera lens and the numeric keypad 11 may be rotated 360 degrees relative the output means. Thus it is easy to watch the output device 2 when the camera lens is in the operative position, and use the keypad 10 or any of the input devices of FIGS. 1b-1d when it is it an operative position. Also, the camera lens 1 may be directed both towards and away from the user.

According to the invention, two or more input devices are provided on different sides of the second portion, such as any combination of the embodiments according to FIGS. 1a-1e. The sides on which the input devices are provided face in a substantially transverse direction relative the axis of rotation. However, the invention is not limited to a transverse direction relative the axis of rotation, as long as the axis of rotation 5 is substantially parallel with the output interface 2.

As the second portion 4 is rotatable relative the first portion 3, any input device 10, 11, 20, 30, 32, 40 may face in the same direction as the output device 2. Thus, the portable electronic device 1 and the output device 2 and the input devices may be conveniently operated. The portable electronic device may be conveniently held in the palm of a user both when either the first or the second input device is in an operational position.

The input devices 10, 11, 20, 30, 32, 40 may be rotated to the same direction as the output device 2. This is an advantage, as several different input devices 10, 11, 20, 30, 32, 40 may be provided in the same module, and when operation thereof is desired, each may be rotated to a position wherein it is convenient to use with the output device 2, such as facing in the same direction as the output interface 2. Consequently, the portable electronic device 1 becomes flexible and easy to operate.

Figure 2A:
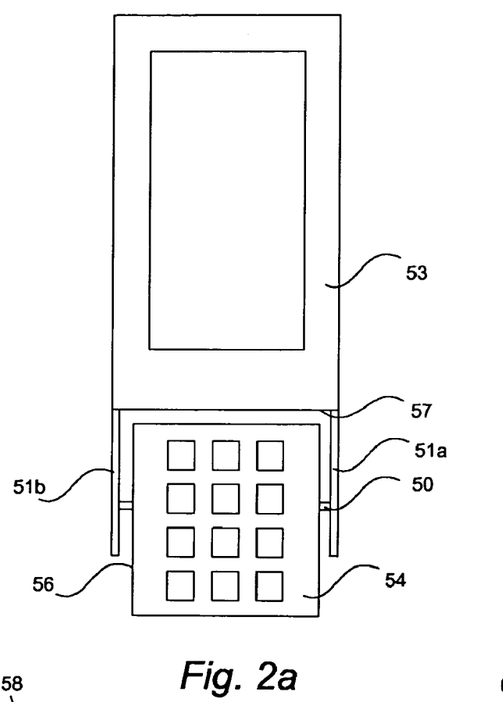
FIG. 2a is a front view of another embodiment of the portable electronic device according to the invention.

FIG. 2a illustrates another embodiment of the invention, wherein the axis of rotation 50 extends in a transverse direction relative the second portion 54. An axis around which the second portion 4 rotates is connected to legs 51a, 51b connected to the first portion 53. The camera lens may be provided on side 56 facing one of the legs 51a, 51b or a bottom side 57 of the first portion 53. Thus a portion of the first portion 53 has the function of a lens cover when the camera lens is in a non-operative position.

Figure 2B:
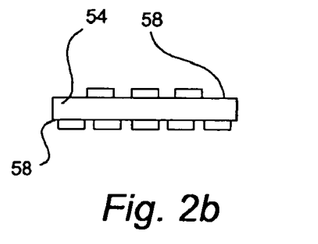

FIG. 2b illustrates the second portion 54 of FIG. 2a in a side view, wherein a numeric keypad is positioned at a first side 58 and an alphanumeric keypad is positioned at a second side 59 of the second portion 54.

Figures 2C, 2D:
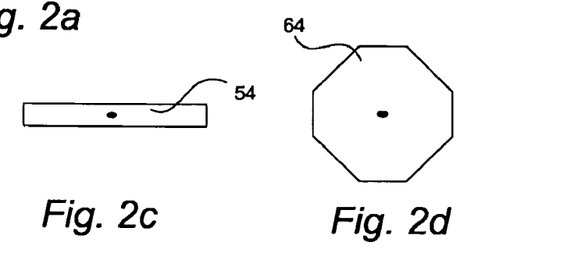
FIG. 2c is a cross sectional view of the portion illustrated in FIG. 2b.
FIG. 2d is a cross sectional view of a another embodiment of a portion of the portable electronic device according to the invention.

FIG. 2c illustrates the second portion of FIG. 2c in cross section. As the second portion has four sides, at least four input devices may be provided at different sides of the second portion.

FIG. 2d illustrates another embodiment of the second portion 64 in cross section. The second portion 64 has six sides in this embodiment. Thus, at least six different input devices may be positioned at different sides of the second portion.

Furthermore, the axis of rotation may not need be longitudinal or transversal direction relative the second portion. For example, in the embodiment of FIG. 2a, the direction of the axis of rotation may be 45 degrees relative a longitudinal axis of the second portion, e.g. from a first corner to a second corner of the second portion.

The second portion 4 may have any number of fixed positions within 0-360 degrees relative the first portion 3. Thus, e.g. if the second portion 4 comprises a first input device at a first side and a second input devices at a second sides extending substantially 90 degrees relative the first side and the second portion 4 is rotatable substantially 90 degrees relative the first portion 3, the first and a second input device 10, 11, 20, 30, 32, 40 may have a position facing in the same direction as the output device 2. Alternatively, if the second portion 4 comprises two input devices at two different sides, the second side facing in a opposite direction relative the first side, and the second portion 4 is rotatable substantially 180 degrees relative the first portion 3, the first and a second input device 10, 11, 20, 30, 32, 40 may have a position facing in the same direction as the output device 2. Also a third input device may be provided at a third side of the second portion. If the second portion 4 comprises four input devices at different sides and is rotatable substantially 270 degrees relative the first portion 3, a first, a second, a third and a fourth input device 10, 11, 20, 30, 32, 40, which all face in different directions, may have a position facing in the same direction as the output device 2 when the second portion 4 is properly rotated relative the first portion 3. This is an advantage, as the portable electronic device 1 may be very stable during operation. For example, if a first input device is numeric keypad 10 positioned at a first side 10a of the second portion 4 and a second input device is an alphanumeric keypad 20a positioned at a second side 20a, which faces in a substantially opposite direction relative the first side, of the second portion 4, the portable electronic device 1 will be equally stable when the first or the second input device is in a position for operation.

Figure 3A:
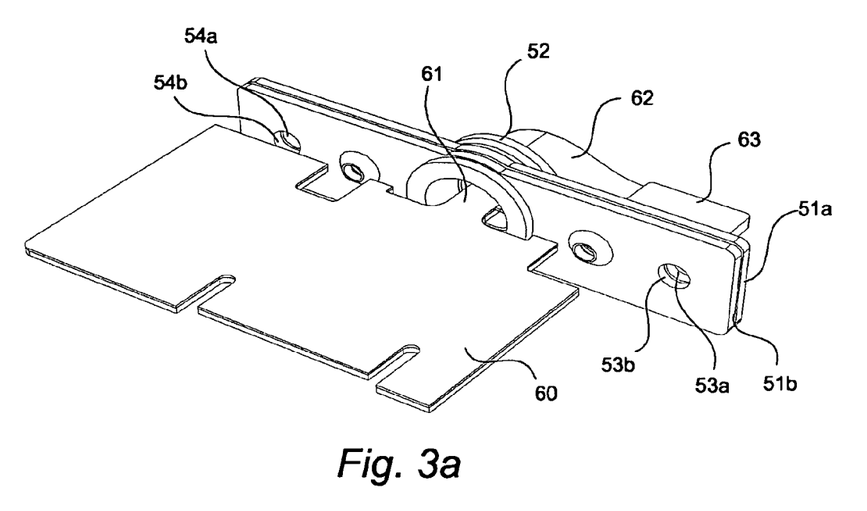
FIGS. 3a-3b are perspective views of one embodiment of a hinge mechanism and a PCB according to the invention.

FIG. 3a illustrates a hinge mechanism 50 for rotatably connecting the first portion 3 to the second portion. The hinge mechanism comprises a first and a second support 51a, 51b, which are pivotably arranged around a cylinder member 52. The first support 51a is connectible to an end portion of the first portion 3 and the second support 51b is connectible to an end portion of the second portion 4. The supports 51a, 51b may be connected to the first and the second portion 3, 4, by means of any fastening means, such as a screw or rivet introduced through holes 53a, 53b, 54a, 54b of the supports 51a, 51b.

The second portion comprises a PCB 60 for connecting the input devices to the circuitry of the first portion 3. A portion 61 of the PCB 60 extends through the cylindrical portion 52, and is connected to a flex portion 62. The flex portion 62 may be provided as a separate unit connected to the PCB 60 or integrated therewith. Thus, the flex portion 62 may be provided in the same material as the PCB. The flex portion 62 has integral signal paths, which are connected to a contact 63 provided at the end of the flex portion 62. The contact 63 is connected to circuitry within the first portion 3, such as a PCB. Providing the flex portion 62 as an integral part of the PCB 60 is an advantage as only one contact has to be provided for connecting the PCB 60 to circuitry within the first portion 3.

Figure 3B:
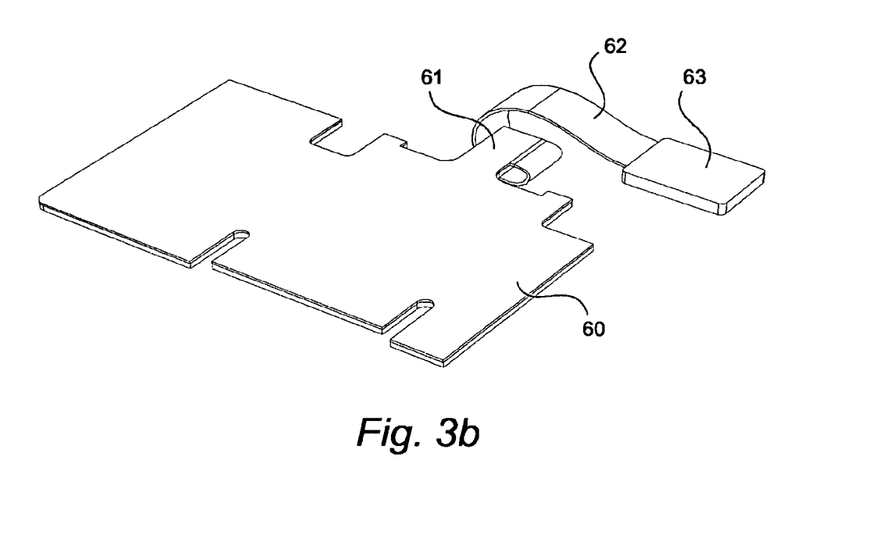

FIG. 3b illustrates another embodiment of the flex portion 62 wherein it extends around the portion 61 of the PCB 60 that extends through the cylinder member 52. Alternatively, the flex portion 62 does not extend around said portion 61 of the PCB 60 when in its rest positioned, but is wound around said portion 61 when the second portion 4, and thus said portion 61 of the PCB 60, is pivoted. Thus, the flex portion 62 may serve as a return mechanism, such that the second portion 4 is returned to its rest position when it has been rotated and subsequently released. Alternatively, the PCB 60 is connected to circuitry within the first portion 3 by means of a cable connection.

Figure 4:
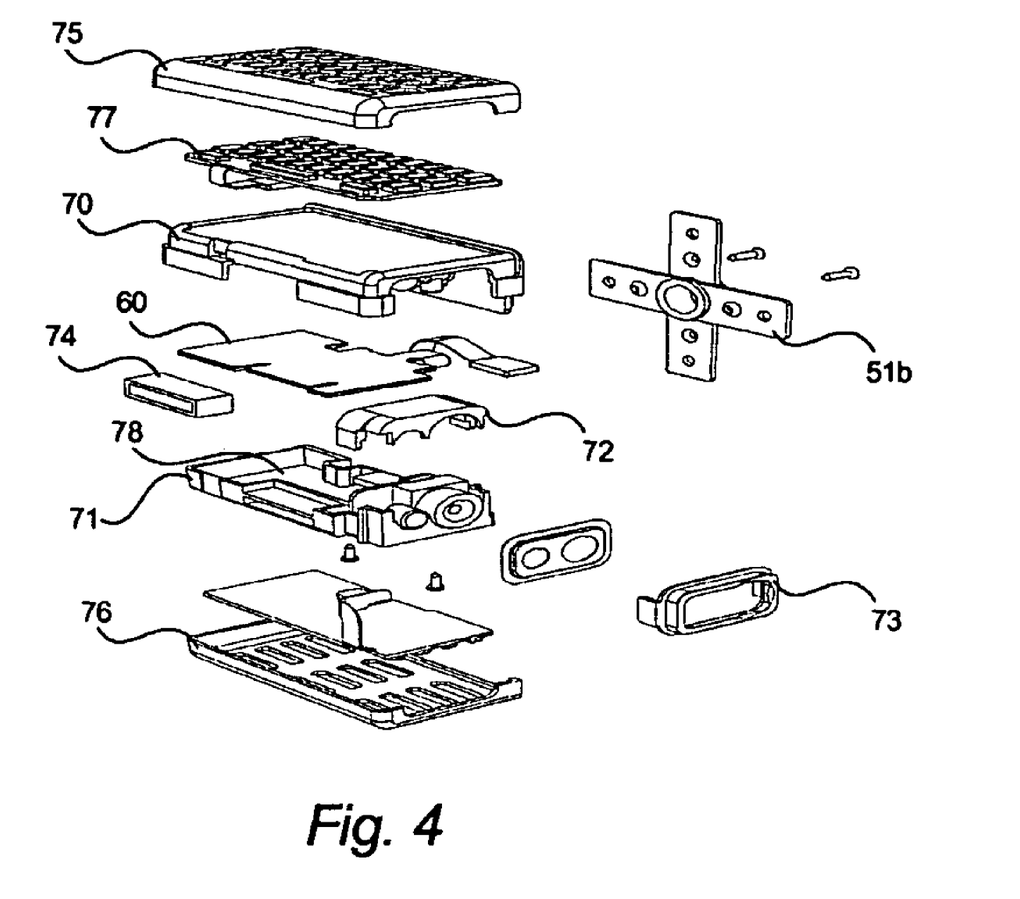
FIG. 4 is an exploded view of one embodiment of the second portion of the portable electronic device according to the invention.

FIG. 4 is an exploded view of one embodiment of the second portion 4. When assembled, the second support 51b is connected to a first chassis member 70, which in turn is connected to a second chassis member 71. The PCB 60 is positioned between the chassis members 70, 71. Also, input devices may be positioned between the chassis members 70, 71. In this embodiment, a camera lens 11 is positioned within a compartment of the second chassis member 71, and held in place by means of a cover 72 attached to the second chassis member 71. A frame 73 may also assist in holding the camera lens in position. A systems connecter 74 may be attached to the PCB. The systems connector may be used for connecting power supply and/or external electronic devices, such as a handsfree unit, to the portable electronic device 1. A first and a second housing cover 75, 76 are connected to the first and second chassis members 70, 71, respectively. Between housing cover 75 and chassis member 70 a keypad 77 may be provided. The chassis member holds the keypad 77 in place. Furthermore, the chassis members 71, 72 may house a loudspeaker (not shown) in a space 78, which may be sufficiently large to provide a resonance chamber.

The second portion 4 and the first portion may be locked into a plurality of positions relative each other, e.g. by means of a snap fitting.

Furthermore, modules having different input devices may be provided with the same input device. The portable electronic device 1 may be manufactured in various versions. Thus, the first portion 3 may only have one design, whereas the second portion may have different designs and comprise different input devices according to the customer's specification.

Furthermore, keys of a numeric keypad may be provided on different sides of the second portion. For example, keys for numeral 1, 2, 3, 4, and 5 may be provided on one side and keys for numerals 6, 7, 8, 9, and 0 may be provided on another side of the second portion 4. Some of the keys may also be provided on the first portion 3.

It is an advantage of the invention that a plurality of input devices that has a size that previously made it inconvenient and bulky to incorporate them into one operating unit may be provided in a single operating unit, such as a numeric keypad and an alphanumeric keypad. Also, the design of the invention is very robust in operative positions of the second portion.

Figure 5A:
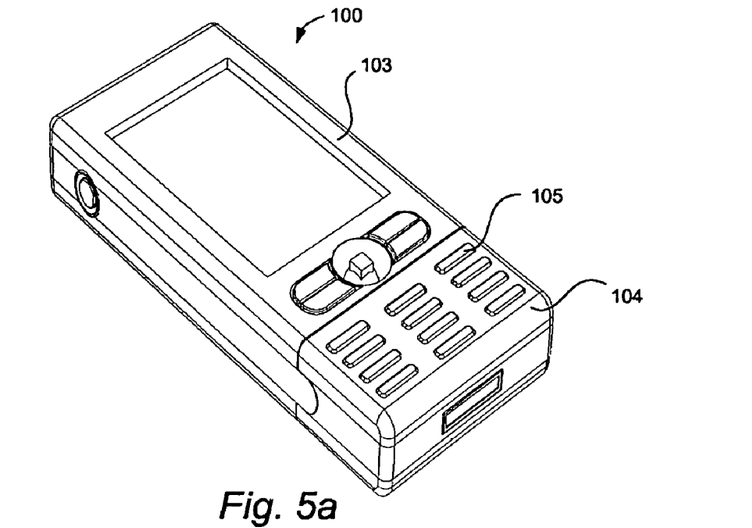
FIGS. 5a-5c are perspective views of an alternative embodiment of the portable electronic device.
Figure 5B:
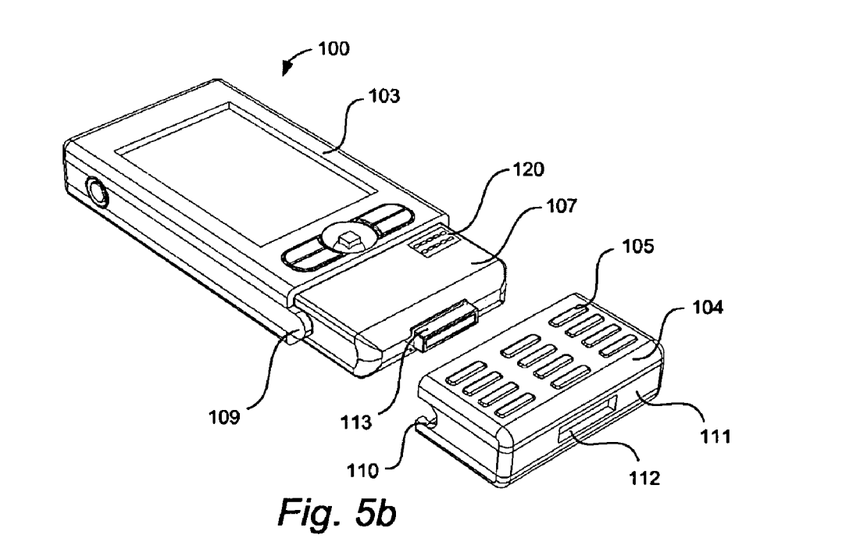
Figure 5C:
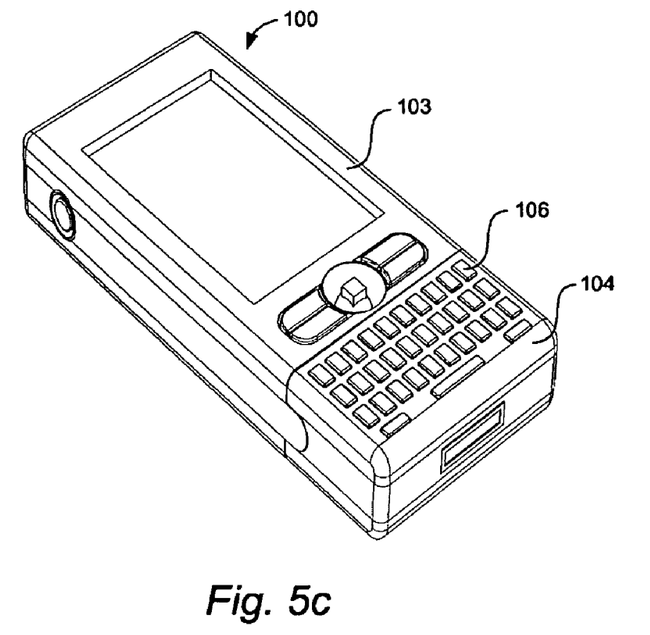

FIGS. 5a-5c illustrate an alternative embodiment of a portable electronic device 100 having a first portion 103 and a second portion 104. The second portion 104 is detachably connected to the first portion 103. The first portion 103 comprises an output device 102, such as a described above. The second portion 104 comprises in this embodiment a first input device 105, e.g. a numeric keypad, on a first side of the second portion 104 and a second input device 106, such as an alphanumeric or QWERTY keypad, on a second side of the second portion 104. The second side may face in a direction substantially opposite and 180 degrees relative the first side.

Figure 5D:
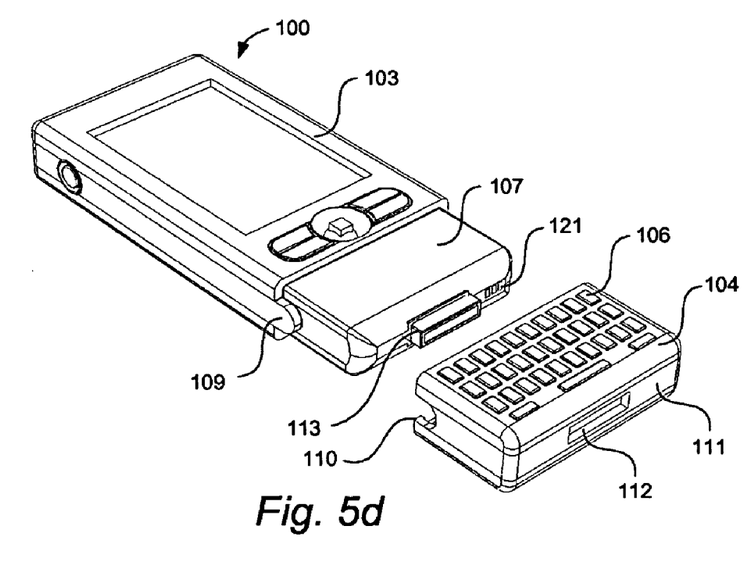

The input devices 105, 106 may be connected to circuitry contained in the first portion 103 by means of a connector means. The connector means may e.g. be leaf spring contact and/or pogo pin contacts. Alternatively, the connector means comprises a female connector included in the first portion 103 and a male connector included in the second portion 104, or vice versa. In FIG. 5b, the connection means comprises contact areas 120 at a lower part 107 of the first portion 103. Leaf spring contacts (not shown) of the second portion 104, which are connected to the circuitry of the input means 105, contact the contact areas 120 when the second portion is in a position for operation, as shown in FIG. 5a. In the embodiment of FIG. 5d, the connection means comprises contact areas 121 positioned at the end of the lower part 107. Pogo pins (not shown) of the second portion 103, which are connected to circuitry of the input device 106, contact areas 121 when the second portion 106 is in a position for operation, as shown in FIG. 5c. In still another embodiment, the contact arrangement of FIGS. 5b and 5c may be combined.

The second portion 104 may comprise and be formed as a hollow casing, into which the lower part 107 of the first portion 103 may extend when the second portion 104 is in an operational position. Thus, the first portion 103 may be rigidly connected to the second portion 104 and a mechanical stability is obtained.

The first portion 103 and the second portion 104 may comprise locking means for locking them together. In the embodiment of FIGS. 5a-5d, the locking means comprises at least one protrusion 109 formed in the casing of the first portion 103. The protrusion 109 mates with a recess 110 of the second portion 104 to provide a snap fitting for instantly locking the second portion 104 to the first portion 103 when the protrusion 109 mates with the recess 110.

One end 111 of the second portion 104 facing away from the first portion 103 may comprise a recess 112 for receiving an accessory connector 113 included in the first portion 103.

It is an advantage with the embodiment of FIGS. 5a-5d that the second portion 104 is detachably connected to the first portion 103. Thus, one or several detachable second portions may be provided, each having a different set of input devices. The portable electronic device 100 is adaptable to a variety of different input devices, such as described above. Thus, the portable electronic device 100 is very flexible.

The present invention has been described above with reference to specific embodiments. However, other embodiments than the above described are equally possible within the scope of the invention. The different features of the invention may be combined in other combinations than those described. The scope of the invention is only limited by the appended patent claims.

The invention claimed is:

1. A portable electronic device, comprising:
   a first portion including at least one output device for rendering output data; and
   a second portion comprising at least two input devices for manually inputting data into the portable electronic device, wherein the second portion is rotatably connected to the first portion,
   wherein
   a printed circuit board provided in the second portion, and
   a flex portion connected to or formed integral with a portion of the printed circuit board, and connected to the first portion, wherein the flex portion is wound around the portion of the printed circuit board at least when the second portion is rotated relative the first portion from a rest position, whereupon said flex portion forms a return mechanism which returns the second portion to the rest position when the second portion has been rotated and subsequently released.

2. The portable electronic device according to claim 1, wherein the output device is directed in the same direction as a first input device when the second portion is positioned in a first position, and in the same direction as another input device when the second portion is positioned in a second position.

3. The portable electronic device according to claim 1, wherein the flex portion comprises circuitry, which is connected to a contact at the end of the flex portion.

4. The portable electronic device according to claim 1, wherein the flex portion is made in the same material as the printed circuit board.

5. The portable electronic device according to claim 1, wherein said flex portion extends 360 degrees around said portion of the printed circuit board in at least one position of said first portion relative said second portion.

6. The portable electronic device according to claim 1, wherein said flex portion does not extend around said portion of the printed circuit board in the rest position for the second portion relative to the first portion.

7. The portable electronic device according to claim 1, wherein the portable electronic device is a radio terminal, a pager, a communicator, an electronic organizer, a smartphone, a handheld device or a personal digital assistant.

8. The portable electronic device according to claim 1, wherein the portable electronic device is a mobile telephone.

* * * * *

UNITED STATES PATENT AND TRADEMARK OFFICE
CERTIFICATE OF CORRECTION

PATENT NO. : 7,925,309 B2
APPLICATION NO. : 11/721987
DATED : April 12, 2011
INVENTOR(S) : Söderlund It is certified that error appears in the above-identified patent and that said Letters Patent is hereby corrected as shown below:

On title page

Front page, Section (60), Related U.S. Application Data should be added:
-- Related U.S. Application Data
(60) Provisional Application No. 60/638,620, filed on Dec. 23, 2004. --

Specification, CROSS REFERENCE TO RELATED APPLICATION should be added immediately after the title:
-- CROSS REFERENCE TO RELATED APPLICATION
This application is a §371 of International Application No. PCT/EP2005/056812 filed on December 15, 2005, which claims benefit to U.S. Provisional Application No. 60/638,620 filed on December 23, 2004, and also claims priority to European Application No. 04030376.0 filed on December 21, 2004.--

Signed and Sealed this
Twenty-seventh Day of September, 2011

David J. Kappos
*Director of the United States Patent and Trademark Office*